US010296129B2

(12) United States Patent
Wang et al.

(10) Patent No.: US 10,296,129 B2
(45) Date of Patent: *May 21, 2019

(54) TOUCH AND HOVER SENSING DEVICE

(71) Applicants: Tsinghua University, Beijing (CN); HON HAI PRECISION INDUSTRY CO., LTD., New Taipei (TW)

(72) Inventors: Xin-He Wang, Beijing (CN); Dong-Qi Li, Beijing (CN); Jiang-Tao Wang, Beijing (CN); Wen-Yun Wu, Beijing (CN); Yu-Jun He, Beijing (CN); Peng Liu, Beijing (CN); Qing-Yu Zhao, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 150 days.

This patent is subject to a terminal disclaimer.

(21) Appl. No.: 14/979,481

(22) Filed: Dec. 27, 2015

(65) Prior Publication Data

US 2016/0188094 A1    Jun. 30, 2016

(30) Foreign Application Priority Data

Dec. 31, 2014    (CN) .......................... 2014 1 0852145

(51) Int. Cl.
*G06F 3/041*    (2006.01)
*G06F 3/047*    (2006.01)
*G06F 3/044*    (2006.01)

(52) U.S. Cl.
CPC ............ *G06F 3/0416* (2013.01); *G06F 3/044* (2013.01); *G06F 3/047* (2013.01);
(Continued)

(58) Field of Classification Search
CPC . G06F 2203/04106; G06F 2203/04108; G06F 3/0416; G06F 3/044; G06F 3/047; Y10S 977/75; Y10S 977/752
See application file for complete search history.

(56) References Cited

U.S. PATENT DOCUMENTS 8,502,786 B2    8/2013    Jiang et al.
8,614,693 B2    12/2013    King et al.
(Continued)

FOREIGN PATENT DOCUMENTS

CN    1381059    11/2002
CN    101937279 A    1/2011
(Continued)

*Primary Examiner* — Viet D Pham
(74) *Attorney, Agent, or Firm* — ScienBiziP, P.C.

(57) ABSTRACT

A touch and hover sensing device includes a hover sensing module is located on a first surface of a substrate, the hover sensing module includes a plurality of first electrostatic sensing elements and a plurality of second electrostatic sensing elements electrically insulated from each other. Each of the plurality of first electrostatic sensing elements and each of the plurality of second electrostatic sensing elements include a single walled carbon nanotube or few-walled carbon nanotube. A touch sensing module is located on a second surface of the substrate. The hover sensing module and the touch sensing module are connected to a control chip, the control chip controls the hover sensing module and the touch sensing module simultaneously working or working separately, to sense a position coordinate of the sensed object.

18 Claims, 6 Drawing Sheets

(52) U.S. Cl.
CPC ............. *G06F 2203/04106* (2013.01); *G06F 2203/04108* (2013.01); *Y10S 977/75* (2013.01); *Y10S 977/752* (2013.01)

(56) References Cited

U.S. PATENT DOCUMENTS

| | | |
|---|---|---|
| 9,323,398 B2 | 4/2016 | Bernstein et al. |
| 2002/0183207 A1 | 12/2002 | Hjortstam et al. |
| 2008/0048996 A1* | 2/2008 | Hu .................... G06F 3/044 345/174 |
| 2009/0153513 A1* | 6/2009 | Liu .................... G06F 3/044 345/173 |
| 2009/0167711 A1* | 7/2009 | Jiang .................. G06F 3/0412 345/173 |
| 2010/0328258 A1 | 12/2010 | Cheng et al. |
| 2011/0304579 A1 | 12/2011 | Feng et al. |
| 2012/0050180 A1 | 3/2012 | King et al. |
| 2014/0013865 A1* | 1/2014 | White ................. G01L 1/14 73/862.626 |
| 2014/0144766 A1* | 5/2014 | Feng .................. H01H 1/027 200/600 |
| 2014/0145980 A1* | 5/2014 | Feng .................. G06F 3/044 345/173 |
| 2014/0282239 A1* | 9/2014 | Locker ............... G06F 3/0482 715/810 |
| 2014/0340590 A1* | 11/2014 | Shih .................. G06F 3/044 349/12 |

FOREIGN PATENT DOCUMENTS

| | | |
|---|---|---|
| CN | 102236439 A | 11/2011 |
| CN | 101859216 | 1/2012 |
| CN | 102483673 | 5/2012 |
| CN | 103168284 | 6/2013 |
| CN | 103235195 A | 8/2013 |
| TW | I416380 | 11/2013 |
| TW | M478871 | 5/2014 |
| WO | 2014009781 A1 | 1/2014 |

* cited by examiner

TOUCH AND HOVER SENSING DEVICE

CROSS-REFERENCE TO RELATED APPLICATIONS

This application claims all benefits accruing under 35 U.S.C. § 119 from China Patent Application No. 201410852145.4, filed on Dec. 31, 2014, in the China Intellectual Property Office. This application is related to commonly-assigned application entitled, "TOUCH AND HOVER SENSING DEVICE", concurrently filed (Atty. Docket No. US56366); "HOVER CONTROLLING DEVICE", concurrently filed (Atty. Docket No. US56367); "HOVER CONTROLLING DEVICE", concurrently filed (Atty. Docket No. US56368). Disclosures of the above-identified applications are incorporated herein by reference.

FIELD

The present application relates to a touch and hover sensing device.

BACKGROUND

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., liquid crystal panels). A user of any such electronic apparatus operates it by pressing or touching the touch panel with a finger, a pen, stylus, or another like tool while visually observing the display device through the touch panel. Therefore, a demand exists for touch panels that provide superior visibility and reliable operation.

With the rapid development of electronic apparatuses, some touch panels need to also recognize a hover event, i.e., an object (hand or touch pen) near but not touching the touch panel, and the position of the hover event at the touch panel.

What is needed, therefore, is to provide a touch and hover sensing device.

BRIEF DESCRIPTION OF THE DRAWINGS

Implementations of the present technology will now be described, by way of example only, with reference to the attached figures, wherein.

DETAILED DESCRIPTION

Figure 1:
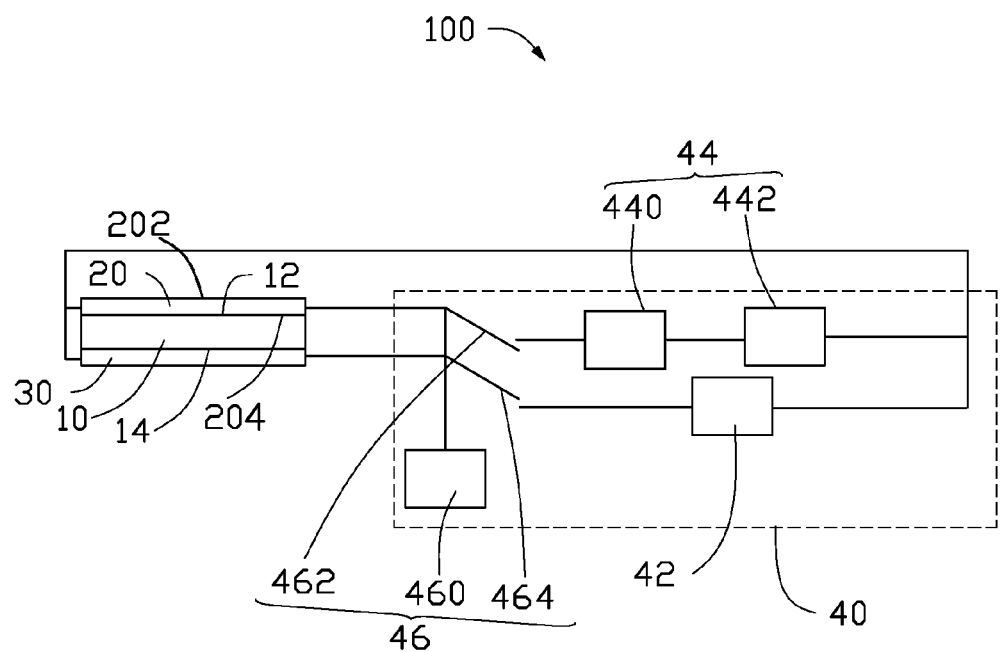
FIG. 1 is a schematic view of one embodiment of a touch and hover sensing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 4:
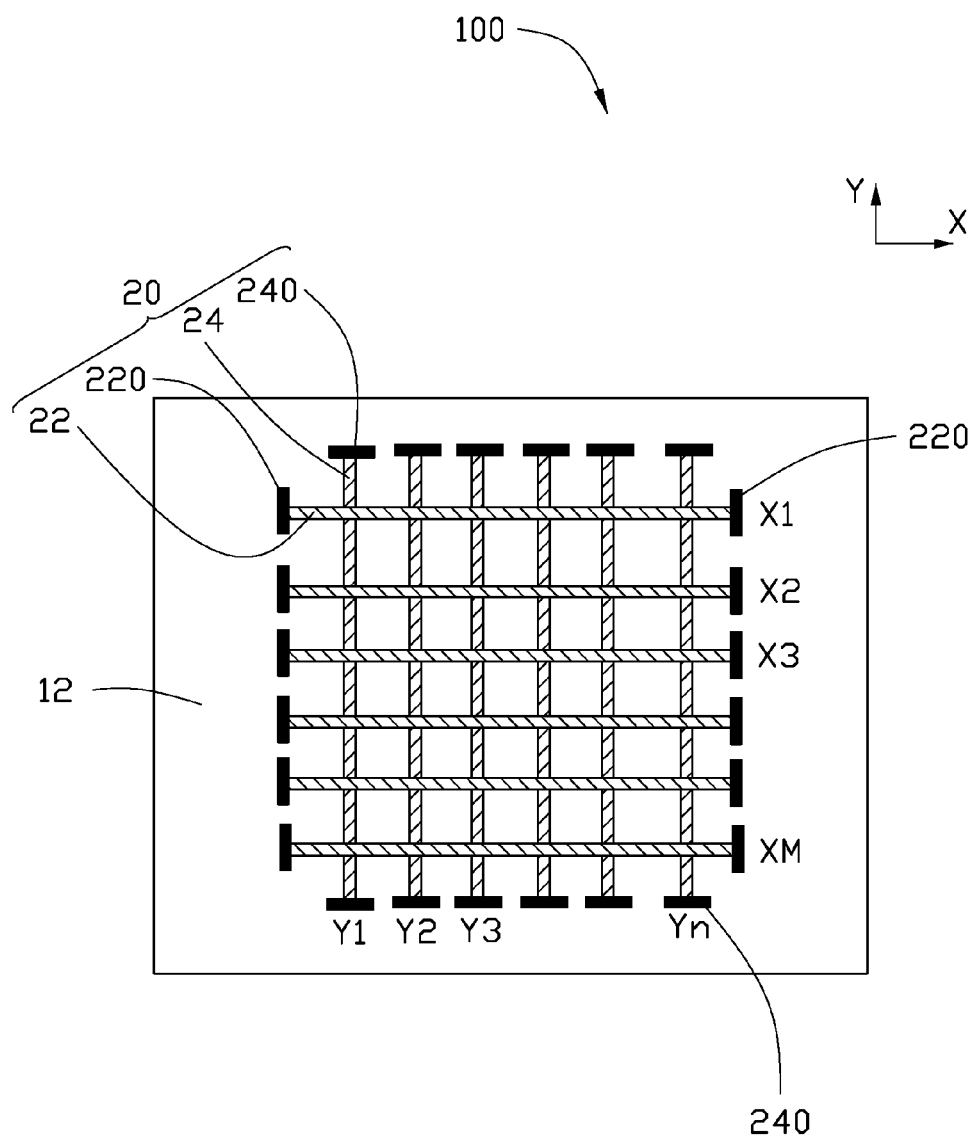
FIG. 4 is a vertical view of one embodiment of a hover sensing module.

Referring to FIGS. 1 and 4, a touch and hover sensing device 100 includes a substrate 10, a hover sensing module 20, a touch sensing module 30, a touch sensing unit 42, a hover sensing unit 44, and a switching control unit 46.

The substrate 10 includes a first surface 12 and a second surface 14 opposite to the first surface 12. The hover sensing module 20 can be located on the first surface 12, and the touch sensing module 30 can be located on the second surface 14. The touch sensing unit 42, the hover sensing unit 44, and the switching control unit 46 can form a touch and hover control system 40. The hover sensing module 20 and the touch sensing module 30 can be coupled to the touch and hover control system 40. The touch and hover control system 40 can control the switching control unit 46 switching between touch and hover sensing modes. The touch and hover control system 40 can be a control chip. The control chip can control the hover sensing module 20 and the touch sensing module 30 working synchronously, to sense a position of a sensed object. The control chip can control the hover sensing module 20 and the touch sensing module 30 working separately, to sense a position of a sensed object. The switching control unit 46 controls electrical connection between the hover sensing module 20 and hover sensing unit 44. The switching control unit 46 controls electrical connection between the touch sensing module 30 and the touch sensing unit 42.

The substrate 10 can be flat or curved to support other elements. The substrate 10 can be insulative and transparent. The substrate 10 can be also opaque. The substrate 10 can be made of rigid materials such as glass, quartz, diamond, plastic or any other suitable material. The substrate 10 can also be made of flexible materials such as polycarbonate (PC), polymethyl methacrylate acrylic (PMMA), polyimide (PI), polyethylene terephthalate (PET), polyethylene (PE), polyether polysulfones (PES), polyvinyl polychloride (PVC), benzocyclobutenes (BCB), polyesters, or acrylic resin. A shape and size of the substrate 10 can be selected according to need. In one embodiment, a thickness of the substrate 10 is less than 1 millimeter. In one embodiment, the substrate 10 is a flat quartz plate, the area of the substrate 10 is 2 centimeters×2 centimeters, the thickness of the substrate 10 is 0.8 millimeters.

The hover sensing module 20 includes a plurality of first electrostatic sensing elements 22, a plurality of second electrostatic sensing elements 24, a plurality of first electrodes 220, and a plurality of second electrodes 240. The plurality of first electrostatic sensing elements 22 and the plurality of second electrostatic sensing elements 24 are intersected with each other, to form a plurality of grids. The plurality of first electrostatic sensing elements 22 and the plurality of second electrostatic sensing elements 24 are electrically insulated from each other. The plurality of first electrostatic sensing elements 22 and the plurality of second electrostatic sensing elements 24 can be located on the first surface 12 of the substrate 10. In one embodiment, the plurality of first electrostatic sensing elements 22 and the plurality of second electrostatic sensing elements 24 are arranged in different planes. Each first electrostatic sensing element 22 has a first end and a second end opposite to the first end. The first end is electrically connected to one first electrode 220, and the second end is electrically connected to another one first electrode 220. Each second electrostatic sensing element 24 has a third end and a forth end opposite to the third end. The third end is electrically connected to one second electrode 240, and the forth end is electrically connected to another one second electrode 240.

A first direction X and a second direction Y, perpendicular to the first direction X, are defined on the first surface 12 of the substrate 10. The plurality of first electrostatic sensing elements 22 extends along the first direction X. The plurality of first electrostatic sensing elements 22 is spaced from each other and parallel to each other. The plurality of second electrostatic sensing elements 24 extends along the second direction Y. The plurality of second electrostatic sensing elements 24 is spaced from each other and parallel to each other. The plurality of first electrostatic sensing elements 22 can be located on the first surface 12 of the substrate 10, and the plurality of second electrostatic sensing elements 24 can be located on the plurality of first electrostatic sensing elements 22. A distance between two adjacent first electrostatic sensing elements 22 and a distance between two adjacent second electrostatic sensing elements 24 can be selected according to resolution ratio. The distance between two adjacent first electrostatic sensing elements 22 and a distance between two adjacent second electrostatic sensing elements 24 can be in a range from about 2 millimeters to about 2 centimeters.

The plurality of first electrostatic sensing elements 22 and the plurality of second electrostatic sensing elements 24 can be one-dimensional semiconducting linear structure in nanoscale with single crystal structure. A diameter of the one-dimensional semiconducting linear structure in nanoscale can be less than 100 nanometers. When the sensed object with electrostatic near but does not touch the plurality of first electrostatic sensing elements 22 and the plurality of second electrostatic sensing elements 24, the resistances of the plurality of first electrostatic sensing elements 22 and the plurality of second electrostatic sensing elements 24 can be changed, and signals of resistance change can be provide.

The one-dimensional semiconducting linear structure in nanoscale can be a semiconducting linear structure with larger length diameter ratio. The length diameter ratio of the one-dimensional semiconducting linear structure is greater than 1000:1.

Each of the plurality of first electrostatic sensing elements 22 and each of the plurality of second electrostatic sensing elements 24 can be semiconducting graphene strips with a width of less than 10 nanometers, a thickness of less than 5 nanometers, and a length of great than 1 centimeter. Each of the plurality of first electrostatic sensing elements 22 and the plurality of second electrostatic sensing elements 24 can be one semiconducting silicon nanowire with a diameter of less than 5 nanometers, and a length of greater than 1 centimeter. Each of the plurality of first electrostatic sensing elements 22 and each of the plurality of second electrostatic sensing elements 24 can be one ultra long single walled carbon nanotube or few-walled carbon nanotube. The few-walled carbon nanotube is a carbon nanotube with wall of from about two layers to about six layers. In one embodiment, the few-walled carbon nanotube has two or three layers wall.

One single walled carbon nanotube or a single few-walled carbon nanotube is quasi-one-dimensional structure. The smaller the diameter of the quasi-one-dimensional structure is, the density of state (DOS) of the quasi-one-dimensional structure is greater. The greater the DOS of the quasi-one-dimensional structure is, the shielding effect of the quasi-one-dimensional structure is smaller. And accordingly, the smaller the shielding effect of the quasi-one-dimensional structure is, the sensibility of sensing static electricity of the quasi-one-dimensional structure is greater. Therefore, the smaller the diameter of the single walled carbon nanotube or few-walled carbon nanotube is, the sensibility of sensing position coordinate of the sensed object is greater.

The diameter of the single walled carbon nanotube or few-walled carbon nanotube can be less than about 5 nanometers. In one embodiment, the diameter of the single walled carbon nanotube or few-walled carbon nanotube is in a range from about 2 nanometers to about 5 nanometers. The ultra long single walled carbon nanotube or few-walled carbon nanotube can have a length greater than 1 centimeter. In one embodiment, the plurality of first electrostatic sensing elements 22 and the plurality of second electrostatic sensing elements 24 are single walled carbon nanotubes or few-walled carbon nanotubes with diameter of about 2 nanometers and length of about 2 centimeters. The single walled carbon nanotubes or few-walled carbon nanotubes can be made by a known method of adopting a "kite-mechanism". An example of the "kite-mechanism" is disclosed in Publication No. US20130252405A1.

Figure 2:
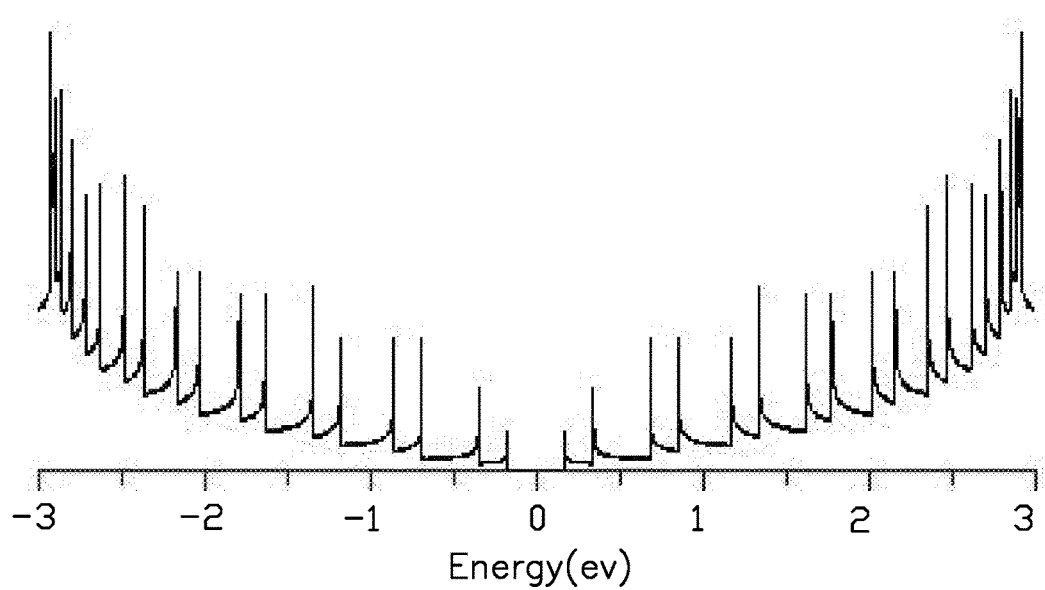
FIG. 2 is an electron density of state distribution curve of carbon nanotube.

As shown in FIG. 2, the state density distribution curve of the carbon nanotube has a lot of singularities. The state density of the carbon nanotube takes great value at the point of the singularity. Distribution of singularities is relatively symmetrical to 0 eV place. In an ideal state without making any doping, the Fermi level locates on 0 eV place. The above properties are all one-dimensional semiconducting linear structure in nanoscale common characteristics. As previously mentioned, sensitive response to the electrostatic requires Fermi surface moving in the vicinity of the singularity of one-dimensional semiconducting linear structure in nanoscale. So that there is a need to make the Fermi level to raise or decrease to the neighborhood singularity nearest to 0 eV.

Figure 3:
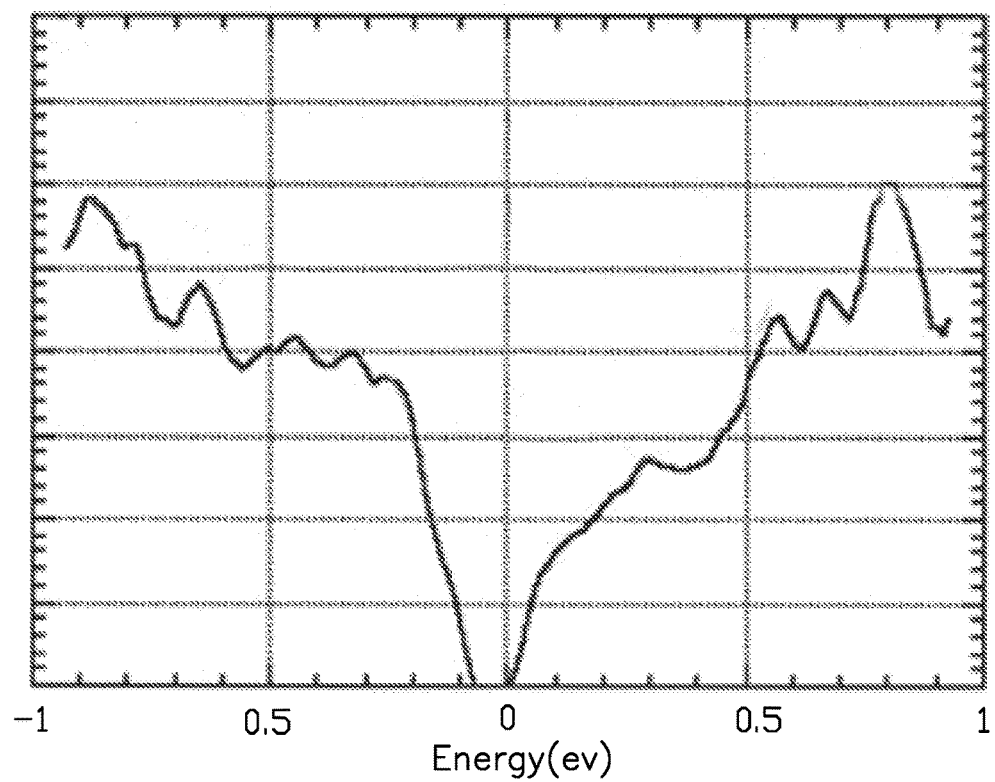
FIG. 3 is an electron density of state distribution curve of carbon nanotube under normal temperature measured by Scanning tunneling spectroscopy (STS).

Referring to FIG. 3, in practice, due to the thermal excitation, surface adsorption and interaction with the surrounding environment, the singularity of one-dimensional semiconducting linear structure in nanoscale will be broadened into a half-height peak with a width L. The peaks are always to be buried because the overlap of the peaks. But, the rising edge of peak singularity nearest 0 eV is always present. To make the one-dimensional semiconducting linear structure in nanoscale having electrostatic sensitive response, the Fermi surface needs to be fixed at a place with a distance to the singularity less than L/2. In practical applications, to obtain sensitive response to the electrostatic, through natural doping, doping and other artificial materials to make the distance between the Fermi surface and the singularity of the one-dimensional semiconducting linear structure in nanoscale within a range of 30 meV~300 meV.

Carbon nanotubes prepared sample exposed to the air, since the formation of oxygen adsorbed p-type doped, the distance from the Fermi surface to singular points in the state density falls within 30~300 meV, preferably 60 to fall within 100 meV. Therefore, thereby preparing natural carbon nanotubes have electrostatic sensitive response. Graphene strips, semiconducting nanowires (e.g. silicon nanowires) can adsorb oxygen to form a p-type doping. A doping can also be used to adjust distance between the Fermi surface and the singular point in the state density within a distance of 30~300 meV.

When the sensed object with static electricity nears the one-dimensional material semiconducting linear structure in nanoscale, the electric potential raise, thus the Fermi level of the one-dimensional semiconducting linear structure in nanoscale would be modulated, the corresponding density of states will change, and the conductivity change. Therefore, when considering the sensitivity of the process, we need to focus on two things: first, modulation efficiency of the sensed object to the Fermi level of the one-dimensional semiconducting linear structure in nanoscale; second, the change rate of the density of states with the Fermi level moving of the one-dimensional semiconducting linear structure in nanoscale.

On the first point, it is strongly influenced by the substrate, the surface adsorption and other environmental factors. It is impossible to quantitatively determine the modulation efficiency of the sensed object to the Fermi level of the one-dimensional semiconducting linear structure in nanoscale theoretically. The modulation efficiency of the sensed object to the Fermi level of the one-dimensional semiconducting linear structure can only be obtained from experimental measurements. For example, the modulation efficiency of the carbon nanotube located on a silica substrate is measured, and the modulation efficiency of the carbon nanotube located on a silica substrate is $4 \times 10^{-5}$. The second point is a requirement about the one-dimensional semiconducting linear structure in nanoscale, which requires the absolute value of $(d\sigma/dE_F)/(\sigma/E_F)$ greater than $10^{-1}$, or greater than $10^{-3}$ ($\sigma$ is the conductivity of the one-dimensional semiconducting linear structure in nanoscale, $E_F$ is the Fermi surface location of the one-dimensional semiconducting linear structure in nanoscale). In this condition, when the sensed objection is close to the one-dimensional semiconducting linear structure in nanoscale, the conductivity change is not less than 10% in favor to signal detection.

When using carbon nanotubes with the diameter distribution of 2-3 nm (carbon nanotubes are located on a silica substrate), the conductivity of the carbon nanotubes reduce by half ($d\sigma/\sigma$~½), when a sensed object with electrostatic 1000V is close to the carbon nanotubes at a place 0.5 meter far from the carbon nanotubes. The modulation efficiency is measured as $4 \times 10^{-5}$, $dE_F$~40 meV $E_F$ of the carbon nanotubes is $E_F$~150 meV. Thus, the absolute value of $(d\sigma/dE_F)/(\sigma/E_F)$ of the carbon nanotubes is about 2. The graphene strips, the semi-conductive nano-wires can satisfy the requirement of $(d\sigma/dE_F)/(\sigma/E_F)$ greater than $10^{-1}$, or greater than $10^{-3}$. If it is just to achieve a qualitative sense the presence or absence of the sensed object with static electricity, $(d\sigma/dE_F)/(\sigma/E_F)$ of one-dimensional semiconducting linear structure in nanoscale is greater than $10^{-3}$. If it is to quantify the amount of sensing electrostatic or sense the position of the sensed object with static electricity, $(d\sigma/dE_F)/(\sigma/E_F)$ of one-dimensional semiconducting linear structure in nanoscale is greater than $10^{-1}$.

The plurality of first electrostatic sensing elements 22 and the plurality of second electrostatic sensing elements 24 can be adhered on the first surface 12 of the substrate 10 by an insulating adhesive. The insulating adhesive can be located on whole surface of the plurality of first electrostatic sensing elements 22, and the plurality of second electrostatic sensing elements 24 can be located on the insulating adhesive. The insulating adhesive can only be located on portions of the plurality of first electrostatic sensing elements 22 intersected with the plurality of second electrostatic sensing elements 24. In one embodiment, the insulating adhesive is only located on the portions of the plurality of first electrostatic sensing elements 22 intersected with the plurality of second electrostatic sensing elements 24.

The plurality of first electrodes 220 and the plurality of second electrodes 240 can be made of a conductive material, such as metal, conductive polymer, conductive adhesive, metallic carbon nanotubes, or indium tin oxide (ITO). The plurality of first electrodes 220 and the plurality of second electrodes 240 can be made by a method such as screen printing, chemical vapor deposition, or magnetron sputtering. In one embodiment, the material of the plurality of first electrodes 220 and the plurality of second electrodes 240 is ITO.

The touch sensing module 30 includes a plurality of third electrodes and a plurality of transparent sensing electrodes located on the second surface 14 of the substrate 10. The plurality of transparent sensing electrodes can be a transparent conductive layer, such as a carbon nanotube layer, a conductive indium tin oxide layer, or a conductive antimony tin oxide layer. In one embodiment, the touch sensing module 30 includes the carbon nanotube layer having a first side and a second side opposite to the first side, the plurality of third electrodes is located on the first side and the second side and electrically connected to the carbon nanotube layer.

The carbon nanotube layer includes a carbon nanotube film. The carbon nanotube film includes a plurality of carbon nanotubes. The carbon nanotube film can be a substantially pure structure of the carbon nanotubes, with few impurities and chemical functional groups. A majority of the carbon nanotubes are arranged to extend along the direction substantially parallel to the surface of the carbon nanotube film. The carbon nanotubes in the carbon nanotube film can be single-walled, double-walled, or multi-walled carbon nanotubes. The length and diameter of the carbon nanotubes can be selected according to need, for example the diameter can be in a range from about 0.5 nanometers to about 50 nanometers and the length can be in a range from about 200 nanometers to about 900 nanometers. The thickness of the carbon nanotube film can be in a range from about 0.5 nanometers to about 100 micrometers, for example in a range from about 100 nanometers to about 200 nanometers. The carbon nanotube film has a good flexibility because of the good flexibility of the carbon nanotubes therein.

The carbon nanotubes of the carbon nanotube film can be arranged orderly to form an ordered carbon nanotube structure or disorderly to form a disordered carbon nanotube structure. The carbon nanotubes in the disordered carbon nanotube structure can be entangled with each other.

The term "disordered carbon nanotube structure" includes, but is not limited to, to a structure where the carbon nanotubes are arranged along many different directions, and the aligning directions of the carbon nanotubes are random. The number of the carbon nanotubes arranged along each different direction can be almost the same (e.g. uniformly disordered). The term "ordered carbon nanotube structure" includes, but is not limited to, to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). In one embodiment, the carbon nanotube film is a free-standing structure. The term "free-standing structure" means that the carbon nanotube film can sustain the weight of itself when it is hoisted by a portion thereof without any significant damage to its structural integrity. Thus, the carbon nanotube film can be suspended by two spaced supports. The free-standing carbon nanotube film can be laid on the epitaxial growth surface directly and easily.

Figure 5:
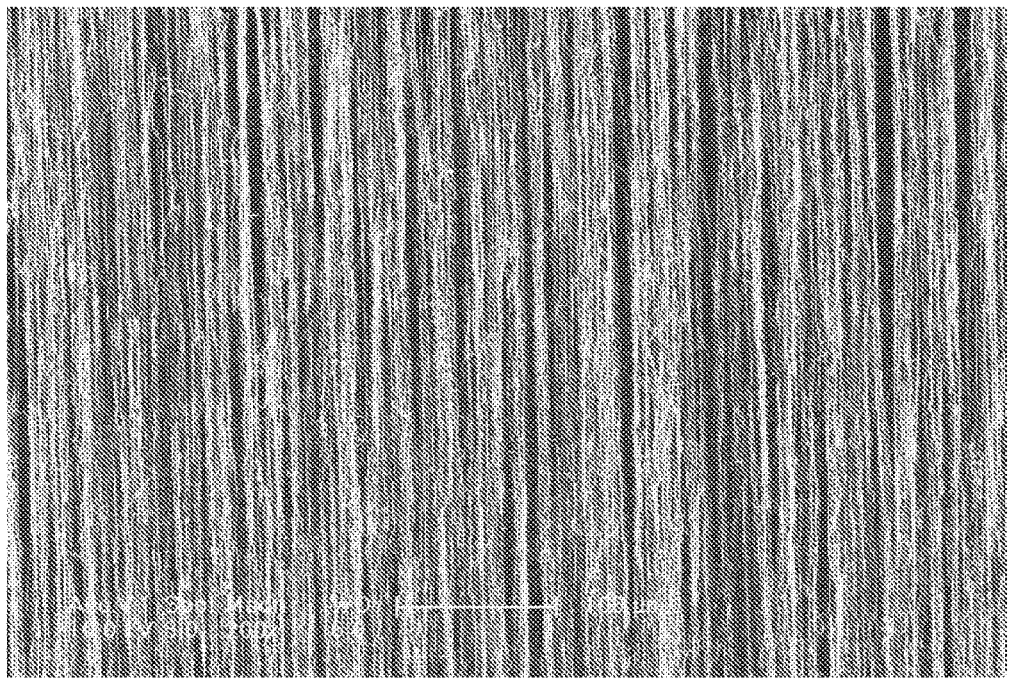
FIG. 5 is a scanning electron microscope (SEM) image of a carbon nanotube film.

The transparent conductive layer can be a single carbon nanotube film. The carbon nanotube film includes a plurality of successive and oriented carbon nanotubes joined end-to-end by van der Waals attractive force therebetween. The carbon nanotube film is a free-standing film. Referring to FIG. 5, each carbon nanotube film includes a plurality of successively oriented carbon nanotube segments joined end-to-end by van der Waals attractive force therebetween. Each carbon nanotube segment includes a plurality of carbon nanotubes parallel to each other, and combined by van der Waals attractive force therebetween. Some variations can occur in the carbon nanotube film. The carbon nanotubes in the carbon nanotube film are oriented along a preferred orientation. The carbon nanotube film can be treated with an organic solvent to increase the mechanical strength and toughness and reduce the coefficient of friction of the carbon nanotube film. A thickness of the carbon nanotube film can range from about 0.5 nanometers to about 100 micrometers.

The transparent conductive layer can include at least two stacked carbon nanotube films. Additionally, when the carbon nanotubes in the carbon nanotube film are aligned along one preferred orientation, an angle can exist between the orientations of carbon nanotubes in adjacent films, whether stacked or adjacent. Adjacent carbon nanotube films can be combined by only the van der Waals attractive force therebetween. An angle between the aligned directions of the carbon nanotubes in two adjacent carbon nanotube films can range from about 0 degrees to about 90 degrees. When the angle between the aligned directions of the carbon nanotubes in adjacent stacked carbon nanotube films is larger than 0 degrees, a plurality of micropores is defined by the carbon nanotube film. Stacking the carbon nanotube films will also add to the structural integrity of the carbon nanotube film.

The carbon nanotube film can be made by the steps of: growing a carbon nanotube array on a wafer by chemical vapor deposition method; and drawing the carbon nanotubes of the carbon nanotube array to from the carbon nanotube film. During the drawing step, the carbon nanotubes are joined end-to-end by van der Waals attractive force therebetween along the drawing direction. The carbon nanotube film has the smallest resistance along the drawing direction and the greatest resistance along a direction perpendicular to the drawing direction. Thus, the carbon nanotube film is resistance anisotropy. Furthermore, the carbon nanotube film can be etched or irradiated by laser. After being irradiated by laser, a plurality of parallel carbon nanotube conductive strings will be formed and the resistance anisotropy of the carbon nanotube film will not be damaged because the carbon nanotube substantially extending not along the drawing direction are removed by burning. Each carbon nanotube conductive string comprises a plurality of carbon nanotubes joined end-to-end by van der Waals attractive force.

When the transparent conductive layer is a carbon nanotube layer, the plurality of third electrodes is located on a side of the carbon nanotube layer, and the side is perpendicular to the orientation of the plurality of carbon nanotubes. Namely, the arrangement direction of the plurality of third electrodes is perpendicular to the extending direction of the plurality of carbon nanotubes in the transparent conductive layer. In one embodiment, the transparent conductive layer is one carbon nanotube film.

An adhesive layer is configured to fix the transparent conductive layer on the second surface 14 of the substrate 10. The adhesive layer can be transparent. The adhesive layer can be made of materials such as hot plastic or UV glue, for example PVC or PMMA. The thickness of the adhesive layer can be in a range from about 1 nanometer to about 500 micrometers, for example, the thickness is in a range from about 1 micrometer to about 2 micrometers. In one embodiment, the adhesive layer is a UV glue layer with a thickness of 1.5 micrometers.

The plurality of first electrodes 220, the plurality of second electrodes 240, and the plurality of third electrodes can be formed by conductive material, such as metal, conductive polymer, conductive adhesive, metallic carbon nanotubes, or indium tin oxide. The plurality of first electrodes 220, the plurality of second electrodes 240, and the plurality of third electrodes can be made by a method such as screen printing, chemical vapor deposition, or magnetron sputtering.

The touch sensing unit 42 can be electrically connected to the plurality of third electrodes by using conductive wire, in order to electrically connect the touch sensing unit 42 to the touch sensing module 30. The touch sensing unit 42 can sense, a capacitive signal formed by touching the touch sensing module 30 by using finger or touch pen, and accordingly, the position of the sensed object can be detected.

The hover sensing unit 44 includes a circuit control element 440 and a current detect element 442. The hover sensing unit 44 can be electrically connected to the plurality of first electrodes 220 and the plurality of second electrodes 240 by conductive wire, in order to electrically connect the hover sensing unit 44 to the hover sensing module 20.

The circuit control element 440 can be electrically connected to the current detect element 442 by conductive wire. A direct voltage can be applied to the plurality of first electrostatic sensing elements 22 and the plurality of second electrostatic sensing elements 24 by the circuit control element 440. The current detect element 442 can detect the currents of the plurality of first electrostatic sensing elements 22 and the plurality of second electrostatic sensing elements 24. Thus, the resistance variations of the plurality of first electrostatic sensing elements 22 and the plurality of second electrostatic sensing elements 24 can be measured.

When the sensed object with electrostatic near but does not touch the plurality of first electrostatic sensing elements 22 and the plurality of second electrostatic sensing elements 24, the resistances of the plurality of first electrostatic sensing elements 22 and the plurality of second electrostatic sensing elements 24 can be changed. The resistance changes lead currents of the plurality of first electrostatic sensing elements 22 and the plurality of second electrostatic sensing elements 24 to change. A position of the sensed object (coordinates on the first surface 12 of the substrate 10) can be measured by a distribution of current values of the first electrostatic sensing elements 22 and the second electrostatic sensing elements 24. The position coordinates is defined on the first surface 12 of the substrate 10.

The hover sensing module 20 has a top surface 202 and a lower surface 204, and the lower surface 204 is located on the first surface 12 of the substrate 10. When a distance between the sensed object and the top surface 202 of the hover sensing module 20 is in a range from about 0.5 centimeters to about 1 centimeter, the hover sensing module 20 can sense the position coordinate of the sensed object.

The switching control unit 46 includes a controller 460, a first switch 462, and a second switch 464. In hover sensing mode, the first switch 462 can couple the hover sensing module 20 to the hover sensing unit 44 to process a hover signal. In touch sensing mode, the second switch 464 can couple the touch sensing module 30 to the touch sensing unit 42 to process a touch sensing signal. The controller 460 can control the first switch 462 and the second switch 464 according to any suitable control scheme. In one embodiment, the controller 460 can switch between the hover sensing mode and the touch sensing mode in response to a timer, where the switching occurs when the timer expires. At that point, the timer can be reset to count down to the next switching. In one embodiment, the controller 460 can switch between the hover sensing mode and the touch sensing mode in response to an input, such as a manual input from a user or a logical input from the device when a particular condition occurs.

The touch and hover sensing device 100 further includes a first protecting layer (not illustrated) and a second protecting layer (not illustrated). The first protecting layer is used to protect the hover sensing module 20. The plurality of first electrostatic sensing elements 22, the plurality of second electrostatic sensing elements 24, the plurality of first electrodes 220, and the plurality of second electrodes 240 are covered by the first protecting layer. The second protecting layer is used to protect the touch sensing module 30. The transparent conductive layer and the plurality of third electrodes are covered by the second protecting layer. The materials of the first protecting layer and the second protecting layer are insulating and transparent, such as polyethylene (PE), polycarbonate (PC), polyethylene terephthalate (PET), polymethyl methacrylate acrylic (PMMA), or thin glass.

In operation of the touch and hover sensing device 100, the hover sensing module 20 is close to a user or the sensed object, and the touch sensing module 30 is away from the user or the sensed object. When the touch and hover sensing device 100 is combined with a display, the touch sensing module 30 is between the display and the hover sensing module 20, and the hover sensing module 20 is also close to the user.

In touch sensing mode, the first protecting layer of the touch and hover sensing device 100 is pressed/touched with one sensed object, such as user's finger or touch pen, to form one or several touch points on the first protecting layer. And accordingly, one or several touch points are formed on the touch sensing module 30, to change capacitance of the touch sensing module 30. The touch sensing unit 42 can sense the capacitive changes of the touch sensing module 30 and convert the capacitive changes to touch signal. The position coordinates of the touch points can be simultaneously identified.

In hover sensing mode, when the sensed object, such as user's finger or touch pen near but does not touch the first protecting layer of the touch and hover sensing device 100, resistances of the plurality of first electrostatic sensing elements 22 and the plurality of second electrostatic sensing elements 24 will change. The resistances are changed because of influence of band gap structure in the single walled carbon nanotube or few-walled carbon nanotube. The resistance changes make the currents of the plurality of first electrostatic sensing elements 22 and the plurality of second electrostatic sensing elements 24 to change.

A current changed value of individual first electrostatic sensing element 22 is related to a distance between the sensed object and the individual first electrostatic sensing element 22. The smaller the distance between the sensed object and the individual first electrostatic sensing element 22 is, the current changed value of the individual first electrostatic sensing element 22 is greater. A current changed value of individual second electrostatic sensing element 24 is related to a distance between the sensed object and individual second electrostatic sensing element 24. The smaller the distance between the sensed object and individual second electrostatic sensing element 24 is, the current changed value of individual second electrostatic sensing element 24 is greater.

The current changed values of the plurality of first electrostatic sensing elements 22 are different from each other, because the distances between the sensed object and each of the plurality of first electrostatic sensing elements 22 are different. The current changed value of the first electrostatic sensing element 22 closest to the sensed object is the largest. Similarly, the current changed value of the second electrostatic sensing element 24 closest to the sensed object is the largest. The current changed values of the plurality of first electrostatic sensing elements 22 and the plurality of second electrostatic sensing elements 24 can be detected by the current detect element 442 and outputted as output signals. Therefore, the distribution of the current changes of the plurality of first electrostatic sensing elements 22 and the plurality of second electrostatic sensing elements 24 is obtained.

The method for detecting the sensed object is explained in detail. The plurality of first electrostatic sensing elements 22 are labeled by $X_m$ according to an arranging order of the plurality of first electrostatic sensing elements 22. The m is a positive integer. The plurality of first electrostatic sensing elements 22 are electrically connected to the hover sensing unit 44 by conductive wires. Thus, when the direct voltage is applied to the plurality of first electrostatic sensing elements 22, the currents of the plurality of first electrostatic sensing elements 22 are detected.

The plurality of second electrostatic sensing elements 24 are labeled by $Y_n$ according to an arranging order of the plurality of second electrostatic sensing elements 24. The n is a positive integer. The plurality of second electrostatic sensing elements 24 are electrically connected to the hover sensing unit 44 by conductive wires. Thus, when the direct voltage is applied to the plurality of second electrostatic sensing elements 24, the currents of the plurality of second electrostatic sensing elements 24 are detected.

The direct voltages are simultaneously applied by the circuit control element 440, when the sensed object nears but not touch the first surface 12 of the substrate 10, currents of the plurality of first electrostatic sensing elements 22 and the plurality of second electrostatic sensing elements 24 will change because of influence of band gap structure in the single walled carbon nanotube or the few-walled carbon nanotube. The current detect element 442 can detect the current changes of the plurality of first electrostatic sensing elements 22 along the second direction Y and the first direction X. The current detect element 442 can detect the current changes of the plurality of second electrostatic sensing elements 24 along the second direction Y and the first direction X.

The current change values of the plurality of first electrostatic sensing elements 22 are defined as IXm. Therefore, m current change values can be obtained, such as $IX_1$, $IX_2$, $IX_3$, ..., IXm. The current change values of the plurality of second electrostatic sensing elements 24 are defined as IYn. Thus, n current change values can be obtained, such as $IY_1$, $IY_2$, $IY_3$, ..., IYn.

The current changed value of the first electrostatic sensing element 22 closest to the sensed object is the largest. The first electrostatic sensing element 22 closest to the sensed object can be known according to the largest current change value of first electrostatic sensing element 22. Thus, the distance between the sensed object and the first electrostatic sensing element 22 closest to the sensed object can be known, and accordingly, the position of the sensed object in the second direction Y can be known, and Y coordinate of the sensed object can be known.

The current changed value of the second electrostatic sensing element 24 closest to the sensed object is the largest. The second electrostatic sensing element 24 closest to the sensed object can be known according to the largest current change value of second electrostatic sensing element 24. Thus, the distance between the sensed object and the second electrostatic sensing element 24 closest to the sensed object can be known, and accordingly, the position of the sensed object in the second direction X can be known, and X coordinate of the sensed object can be known. The position of the sensed object can be obtained according to Y coordinate and X coordinate of the sensed object. An electrical device including the touch and hover sensing device 100 can be controlled by the position coordinates of the sensed object, after determining the position coordinates of the sensed object.

The touch and hover sensing device 100 can distinguish the moving of touch pen or gesture. The moving of touch pen or gesture can achieve transmission of instruction, and accordingly, achieve operation of electrical device including the touch and hover sensing device 100. The electrical device can be display or switch. Multi-touch control and multi-hover control can be achieved by adjusting driving mode and computational method. A Z direction of position of the sensed object can be determined by analysing signal strength.

Figure 6:
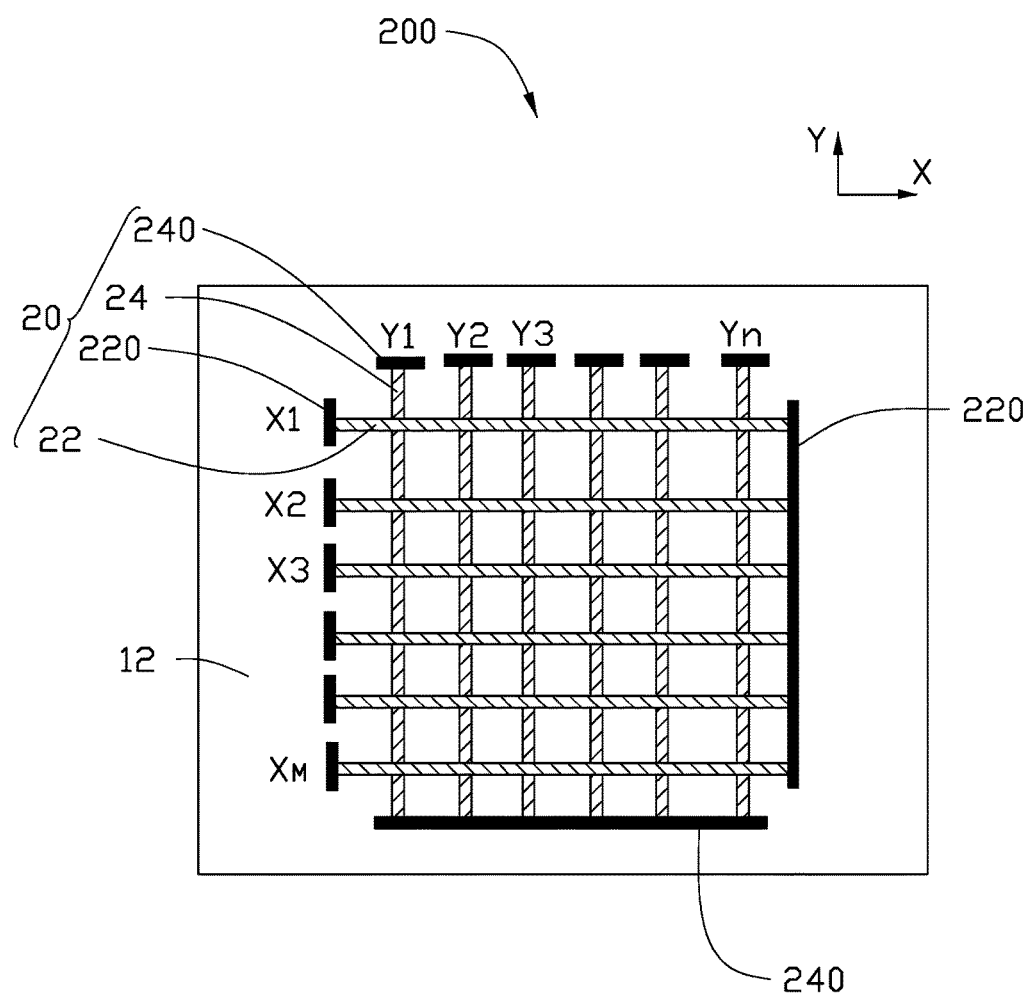
FIG. 6 is a vertical view of another embodiment of a hover sensing module.

Referring to FIG. 6, an embodiment of a touch and hover sensing device 200 is shown where the plurality of first electrostatic sensing elements 22 have a first end and a second end opposite to the first end, the first end of each first electrostatic sensing element 22 is electrically connected to one first electrode 220, and the second ends of all first electrostatic sensing element 22 is electrically connected together to one first electrode 220.

In summary, the touch and hover sensing device 100 can detect touch action and hover action according to direct current signal and alternating current signal.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may include some indication in reference to certain steps. However, the indication used is only to be viewed for identification purposes and not as a suggestion as to an order for the steps.

What is claimed is:

1. A touch and hover sensing device, comprising:
an insulating substrate having a first surface and a second surface opposite to the first surface;
a hover sensing module located on the first surface, wherein the hover sensing module comprises a plurality of first electrostatic sensing elements spaced from each other along a first direction, a plurality of second electrostatic sensing elements spaced from each other along a second direction, a plurality of first electrodes being metal electrodes, and a plurality of second electrodes being metal electrodes; the plurality of first electrostatic sensing elements and the plurality of second electrostatic sensing elements are electrically insulated from each other, each of the plurality of first electrostatic sensing elements and each of the plurality of second electrostatic sensing elements is only one single walled carbon nanotube or only one few-walled carbon nanotube with two walls to six walls that is used for sensing static electricity, and a resistance of the single walled carbon nanotube or the few-walled carbon nanotube is variable; each of the plurality of first electrostatic sensing elements has a first end and a second end opposite to the first end, one of the plurality of first electrodes is in direct contact with the first end, and another one of the plurality of first electrodes is in direct contact with the second end; and each of the plurality of second electrostatic sensing elements has a third end and a fourth end opposite to the third end, one of the plurality of second electrodes is in direct contact with the third end, and another one of the plurality of second electrodes is in direct contact with the fourth end;
a touch sensing module located on the second surface; and
a control chip electrically connected to the hover sensing module and the touch sensing module, wherein the control chip is configured to control the hover sensing module and the touch sensing module.

2. The touch and hover sensing device of claim 1, wherein a distance between two adjacent first electrostatic sensing elements and a distance between two adjacent second electrostatic sensing elements are in a range from about 2 millimeters to about 2 centimeters.

3. The touch and hover sensing device of claim 1, wherein the touch sensing module comprises a carbon nanotube layer, a conductive indium tin oxide layer, or a conductive antimony tin oxide layer.

4. The touch and hover sensing device of claim 1, wherein the hover sensing module determines the position coordinate of the sensed object by sensing a distribution of current values of the plurality of first electrostatic sensing elements and the plurality of second electrostatic sensing elements.

5. The touch and hover sensing device of claim 1, wherein the second direction is perpendicular to the first direction.

6. The touch and hover sensing device of claim 1, wherein the plurality of first electrostatic sensing elements is parallel to each other, and the plurality of second electrostatic sensing elements is parallel to each other.

7. The touch and hover sensing device of claim 1, further comprising a touch and hover control system comprising a touch sensing unit, a hover sensing unit, and a switching control unit.

8. The touch and hover sensing device of claim 7, wherein the switching control unit is configured to control an electrical connection between the hover sensing module and the hover sensing unit.

9. The touch and hover sensing device of claim 7, wherein the switching control unit is configured to control an electrical connection between the touch sensing module and the touch sensing unit.

10. The touch and hover sensing device of claim 1, wherein the resistance of the single walled carbon nanotube or the resistance of the few-walled carbon nanotube changes when a sensed object with static electricity is close to but does not touch the hover sensing module.

11. A touch and hover sensing device, comprising:
an insulating substrate having a first surface and a second surface opposite to the first surface;
a hover sensing module located on the first surface, wherein the hover sensing module comprises a plurality of first electrostatic sensing elements spaced with each other along a first direction, a plurality of second electrostatic sensing elements spaced with each other along a second direction perpendicular to the first direction, a plurality of first electrodes, and a plurality of second electrodes; the plurality of first electrostatic sensing elements and the plurality of second electrostatic sensing elements are electrically insulated from each other, each of the plurality of first electrostatic sensing elements and each of the plurality of second electrostatic sensing elements is a single walled carbon nanotube or a few-walled carbon nanotube used for sensing static electricity, and a resistance of the single walled carbon nanotube or the few-walled carbon nanotube is variable; each of the plurality of first electrostatic sensing elements has a first end and a second end opposite to the first end, one of the plurality of first electrodes is in direct contact with the first end, and another one of the plurality of first electrodes is in direct contact with the second end; and each of the plurality of second electrostatic sensing elements has a third end and a fourth end opposite to the third end, one of the plurality of second electrodes is in direct contact with the third end, and another one of the plurality of second electrodes is in direct contact with the fourth end;
a touch sensing module located on the second surface, comprising a carbon nanotube layer comprising a plurality of carbon nanotubes extending approximately along a same direction; and
a control chip electrically connected to the hover sensing module and the touch sensing module, wherein the control chip is configured to control the hover sensing module and the touch sensing module.

12. The touch and hover sensing device of claim 11, wherein the number of walls of the few-walled carbon nanotube ranges from two to six.

13. The touch and hover sensing device of claim 11, wherein a distance between two adjacent first electrostatic sensing elements and a distance between two adjacent second electrostatic sensing elements are in a range from about 2 millimeters to about 2 centimeters.

14. The touch and hover sensing device of claim 11, wherein the hover sensing module determines the position coordinate of the sensed object by sensing a distribution of current values of the plurality of first electrostatic sensing elements and the plurality of second electrostatic sensing elements.

15. The touch and hover sensing device of claim 11, wherein the single walled carbon nanotube or the few-walled carbon nanotube has a diameter of less than 5 nanometers, and a length of greater than 1 centimeter.

16. The touch and hover sensing device of claim 11, wherein the plurality of first electrostatic sensing elements is parallel to each other, and the plurality of second electrostatic sensing elements is parallel to each other.

17. The touch and hover sensing device of claim 11, wherein the resistance of the single walled carbon nanotube or the resistance of the few-walled carbon nanotube changes when a sensed object with static electricity is close to but does not touch the hover sensing module.

18. The touch and hover sensing device of claim 11, wherein the single walled carbon nanotube or the few-walled carbon nanotube is in direct contact with the first surface of the insulating substrate consisting of glass, quartz, or diamond.

* * * * *